United States Patent [19]

Potash et al.

[11] 4,346,438

[45] Aug. 24, 1982

[54] DIGITAL COMPUTER HAVING PROGRAMMABLE STRUCTURE

[75] Inventors: Hanan Potash, La Jolla; Burton L. Levin, San Diego; Stephen J. C. Chan, San Diego, all of Calif.

[73] Assignee: Burroughs Corporation, Detroit, Mich.

[21] Appl. No.: 87,666

[22] Filed: Oct. 24, 1979

[51] Int. Cl.³ .............................................. G06F 9/26
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,631,405 | 12/1971 | Hoff | 364/200 |
| 3,691,531 | 9/1972 | Saltini et al. | 364/200 |
| 3,760,369 | 9/1973 | Kemp | 364/200 |
| 3,953,833 | 4/1976 | Shapiro | 364/200 |
| 3,972,028 | 7/1976 | Weber et al. | 364/200 |
| 3,983,539 | 9/1976 | Faber et al. | 364/200 |
| 4,007,444 | 2/1977 | Anceau et al. | 364/200 |
| 4,042,972 | 8/1977 | Gruner et al. | 364/200 |
| 4,079,452 | 3/1978 | Larson et al. | 364/900 |
| 4,084,235 | 4/1978 | Hirtle et al. | 364/200 |
| 4,168,523 | 9/1979 | Chari et al. | 364/200 |

Primary Examiner—Gareth D. Shaw
Assistant Examiner—C. T. Bartz
Attorney, Agent, or Firm—Charles J. Fassbender; Kevin R. Peterson

[57] ABSTRACT

Disclosed is a digital computer whose structure is programmable. As a result, the computer's data section, which transforms operands in response to control word sequences, can be readily changed to interpret different types of control words. This is to be distinguished from merely changing the sequence of some fixed set of control words in a control memory. The disclosed programmable structure also enables the computer's control section, which generates the control word sequences, to be readily modified to perform different types of branches as opposed to branches of some rigidly fixed set.

30 Claims, 10 Drawing Figures

Fig. 2

| | FUNCTION | MEMORY 17 B1-B4 | OUT | MEMORYS 10-1 THRU 10-N A4-A6 | OUT |
|---|---|---|---|---|---|
| 1 | PA + N1 if bit 1 of selected register = 1<br>PA + N2 " " " " " " = 0 | 0 | +N1<br>+N2 | 0 | A1 + A3 (S, C$_a$) |
| 2 | PA + N1 if bit 2 of selected register = 1<br>PA + N2 " " " " " " = 0 | 1 | +N1<br>+N2 | 0 | A1 + A3 (S, C$_a$) |
| 3 | PA + N1 if bits 1 & 2 of selected register = 00<br>PA + N2 " " " " " " = 01<br>PA + N3 " " " " " " = 10<br>PA + N4 " " " " " " = 11 | 2 | +N1<br>+N2<br>+N3<br>+N4 | 0 | A1 + A3 (S, C$_a$) |
| 4 | PA + N1 + C if bits 1 & 2 of selected register = 00<br>PA + N2 + C " " " " " " = 01<br>PA + N3 + C " " " " " " = 10<br>PA + N4 + C " " " " " " = 11 | 2 | N1 + C<br>N2 + C<br>N3 + C<br>N4 + C | 1 | A1 + A3 + C (S, C$_a$) |
| 5 | LINK + C | X | X | 2 | A2 + C (S, C$_a$) |
| 6 | LINK + N1 if bit 2 of selected register = 1<br>LINK + N2 " " " " " " = 0 | 1 | N1<br>N2 | 3 | A1 + A2 (S, C$_a$) |
| 7 | B5, B6, ··· B10, PA7, PA8, ···PAN | 3 | B5, B6, ···B12 | 4 | A1(1-6), A3(7-N) |

| A6 A5 A4 | A3 A2 A1 | Ø2 Ø1 | | A6 A5 A4 | A3 A2 A1 | Ø2 Ø1 | Ø2 Ø1 |
|---|---|---|---|---|---|---|---|
| 0 0 0 | 0 0 0 | 0 0 | | 0 1 0 | 0 0 0 | 0 0 | 0 1 |
| ↑ | 0 0 1 | 0 1 | | ↑ | 0 0 1 | 0 0 | 0 1 |
| | 0 1 0 | 0 0 | | | 0 1 0 | 0 1 | 1 0 |
| PA | 0 1 1 | 0 1 | | LINK | 0 1 1 | 0 1 | 1 0 |
| + | 1 0 0 | 0 1 | | + | 1 0 0 | 0 0 | 0 1 |
| MEM. 17 | 1 0 1 | 1 0 | | C | 1 0 1 | 0 0 | 0 1 |
| | 1 1 0 | 0 1 | | | 1 1 0 | 0 1 | 1 0 |
| ↓ | | | Ø2 Ø1 | ↓ | | | |
| 0 0 0 | 1 1 1 | 1 0 | | 0 1 0 | 1 1 1 | 0 1 | 1 0 |
| 0 0 1 | 0 0 0 | 0 0 | 0 0 | 1 0 0 | 0 0 0 | 0 0 | 0 0 |
| ↑ | 0 0 1 | 0 1 | 1 0 | ↑ | 0 0 1 | 0 0 | 0 1 |
| PA | 0 1 0 | 0 0 | 0 1 | | 0 1 0 | 0 0 | 0 0 |
| + | 0 1 1 | 0 1 | 1 0 | MEM. 17 | 0 1 1 | 0 0 | 0 1 |
| MEM. 17 | 1 0 0 | 0 1 | 1 0 | (1-6) | 1 0 0 | 0 1 | 0 0 |
| + | 1 0 1 | 1 0 | 1 1 | PA (7-N) | 1 0 1 | 0 1 | 0 1 |
| C | 1 1 0 | 0 1 | 1 0 | | 1 1 0 | 0 1 | 0 0 |
| ↓ | | | | ↓ | | | |
| 0 0 1 | 1 1 1 | 1 0 | 1 1 | 1 0 0 | 1 1 1 | 0 1 | 0 1 |

| 1 | $D_1 D_2 \rightarrow T_1(C_1, C_2, C_3, C_4, N_1)$ ; $D_3 D_4 \rightarrow T_2(C_1, C_2, C_3, C_4, N_2)$ |
|---|---|
| 2 | $D_1 D_2$ = Sum, carry of $C_1, C_2$; $D_3 D_4$ = Sum, carry of $C_3, C_4$ |
| 3 | $D_1 D_2$ = $C_1$ AND $C_2$ OR $C_3$ OR $\overline{C_4}$ AND $M$; $D_3 D_4$ = Sum, carry of $C_1, C_2, N_3$ |

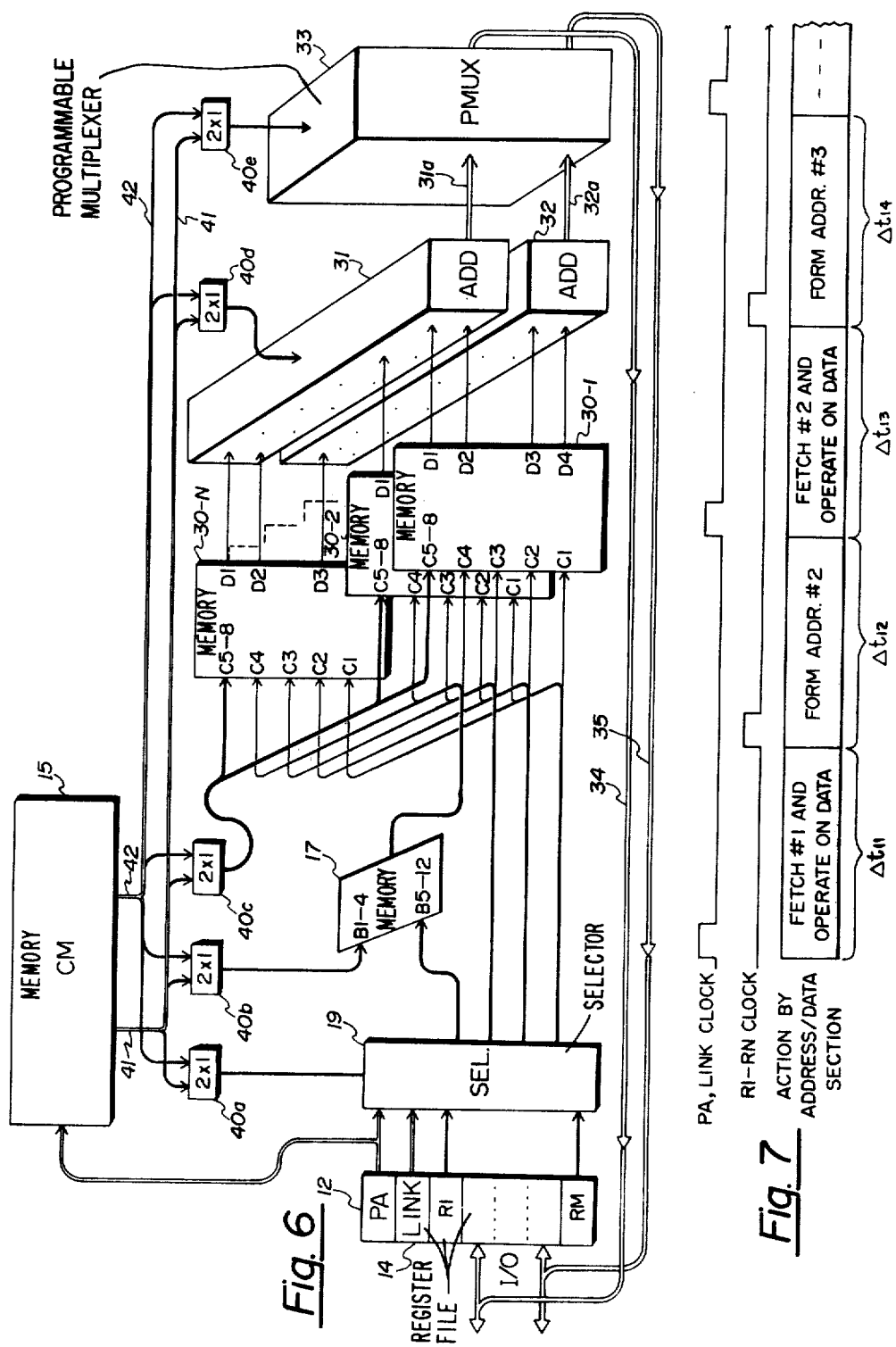

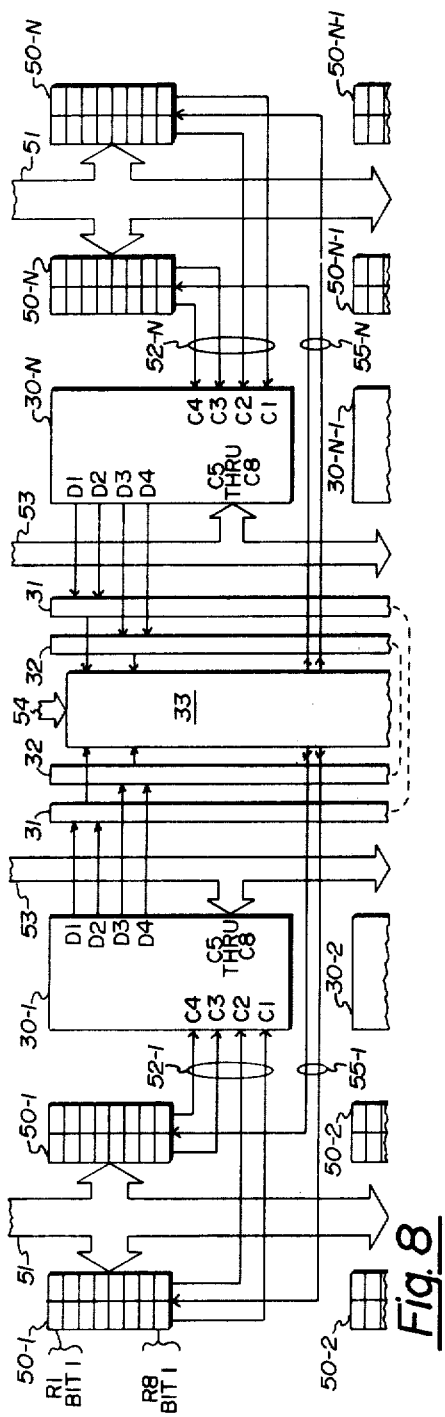
*Fig. 8*
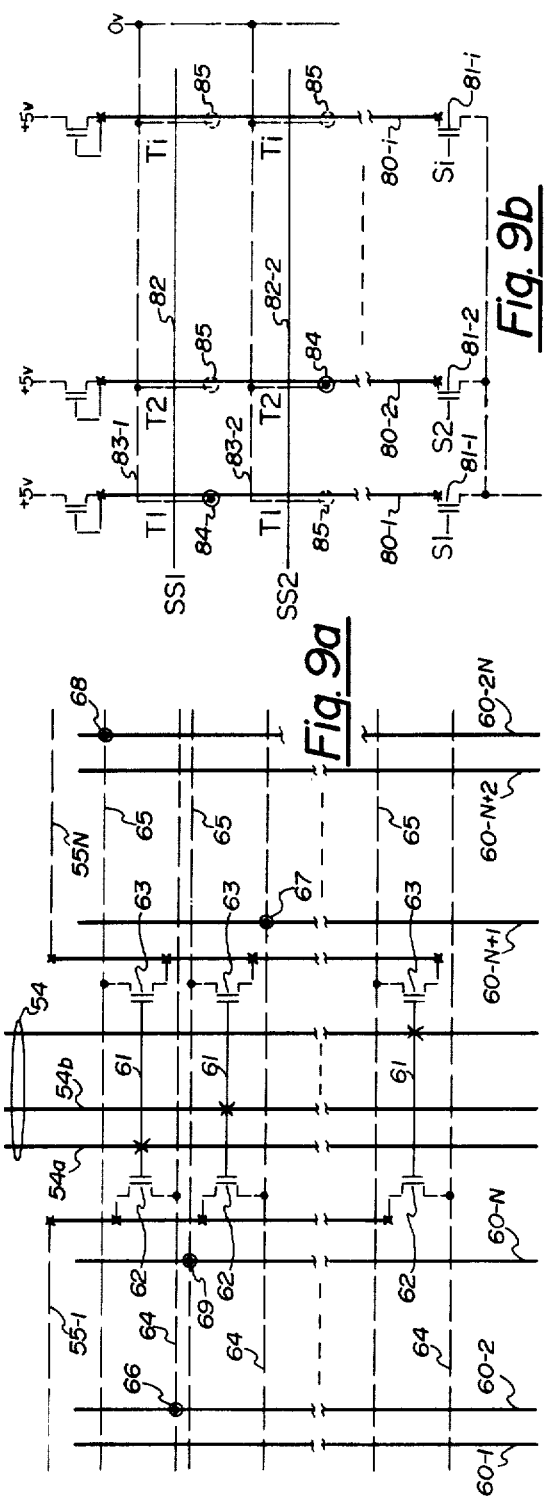
*Fig. 9a*
*Fig. 9b*

DIGITAL COMPUTER HAVING PROGRAMMABLE STRUCTURE

BACKGROUND OF THE INVENTION

This invention relates to digital computers; and more particularly to the computer's overall architecture. In the prior art, a wide variety of computer architectures existed. However, they all basically fall into the two broad catagories of being either a microprogrammed or a non-microprogrammed machine.

A non-microprogrammed computer is characterized as one which interprets and executes user level instructions directly with a plurality of hardwired logic gates. In comparison, a microprogrammed computer interprets and executes each user level instruction by executing a series of microcommands. These microcommands in turn are interpreted and executed by the hardwired logic gates.

One attractive feature of the microprogrammed computer is its regularity and simplicity in architecture. This is due to the fact that the microcommands, which the hardwired logic interprets and executes, generally are much simpler than the corresponding user level commands. Thus, a microprogrammed computer having one particular user level command set generally will contain substantially fewer hardware logic gates than a non-microprogrammed computer with the same user level command set.

Those logic gates which are eliminated in the microprogrammed computer however, are replaced with a set of microcommands in the control memory. Thus, the total hardware in a microprogrammed computer, including the control memory, is generally about the same as that in a corresponding non-microprogrammed computer. However, it is much easier to modify microcommands in a control memory than it is to add and delete hardwired logic gates and their interconnections. This is a most important requirement in computers whose user level language is subject to change, and in computers which emulate several user level languages. Thus, another feature of a microprogrammed computer, and perhaps its most important feature is its flexibility and the ease with which modifications can be incorporated.

But in the prior art, the extent to which even a microprogrammed computer could be modified was constrained because the logic which implemented the microcommands was hardwired. Thus, the set of microcommands that a programmer could use was fixed; and only their order in the control memory was programmable. Accordingly, new types of microcommands could be added only at the expense of modifying various hardwired logic gates and their interconnections. And this made the personality of the machine too rigid.

Thus, a primary object of this invention is to provide a more flexible architecture for a digital computer.

Another object of the invention is to provide a computer that has variable sets of microcommands.

Still another object of the invention is to provide a computer whose interpretation of a given set of microcommands is programmable.

BRIEF SUMMARY OF THE INVENTION

One embodiment of the invention is a digital computer having a programmable structure in its control section. This allows the types of branches which are taken to be readily modified. The programmable structure is comprised of a set of N memories each of which have first address inputs, second address inputs, and a pair of outputs. A plurality of registers have their ith bit coupled to the first address inputs on the ith one of the N memories, where $i = 1, \ldots N$. An adder is coupled to the pair of outputs from each of the memories in the set; a control memory that stores control words has address inputs coupled to receive the adder's output signals.

One portion of the control words from the control memory couples to the second address inputs of all of the memories of the set. And these memories are responsive to the control word portion on their second address inputs to generate signals on their output pairs representing arithmetic transformations of the bits on their first address inputs. The exact type of transformation which occurs in response to any particular control word portion is programmable. And the results are utilized to address the next control word in the control memory.

Another embodiment of the invention is a digital computer having a programmable structure in its data section. This programmable structure includes a set of N memories; and each of them have first address inputs, second address inputs coupled to receive a portion of a presently active control word, and at least one pair of outputs. Each memory of the set is responsive to the control word portion on its second address inputs to generate programmable transformations of the bits on their first address inputs. A plurality of registers have their ith bit coupled to the first address inputs on the ith one of the N memories, where $i = 1, \ldots N$; and adder means respectively coupled to the output pairs from all of the memories of the set. A programmable multiplexer couples to the output of the adder; and it shifts the adder's output by a programmable number of bit positions in response to another portion of the active control word.

Still another embodiment of the invention has a programmable structure in an integrated control/data section. It operates to generate control words during spaced apart time intervals, and transform operands in response to those control words between the spaced apart time interval. This programmable structure also includes a set of N memories where each of the memories have first address inputs, second address inputs, and two pairs of outputs. A plurality of registers have their ith bit coupled to the first address inputs on the ith one of the N memories, where $i = 1, \ldots N$. First and second adder means respectively couple to the output pairs of the memories. A control memory has address signals coupled to receive an address from one of the registers, and has outputs for generating the control words thereon. A plurality of 2×1 switches couple one portion of the control words to the second address inputs of all of the memories during the spaced apart time intervals, and couple another portion of the control words thereto between the spaced time intervals.

BRIEF DESCRIPTION OF THE DRAWINGS

Various features and advantages of the invention will best be understood by reference to the following detailed description and accompanying drawings wherein:

FIG. 2 illustrates various transformations that are performed by the set of N memories in the control section of the FIG. 1 embodiment.

FIG. 6 is a schematic block diagram illustrating another embodiment of the invention.

FIG. 7 is a timing diagram illustrating the sequential operation of the FIG. 6 embodiment.

FIG. 8 is a greatly enlarged plan view of a physical layout on a semiconductor chip for a portion of the FIG. 1 and FIG. 6 embodiments.

FIG. 9a is a detailed circuit diagram and physical layout for the programmable multiplexer of FIG. 8.

FIG. 9b is a detailed circuit diagram and physical layout for one memory of the set in the physical layout of FIG. 8.

DETAILED DESCRIPTION

Figure 1:
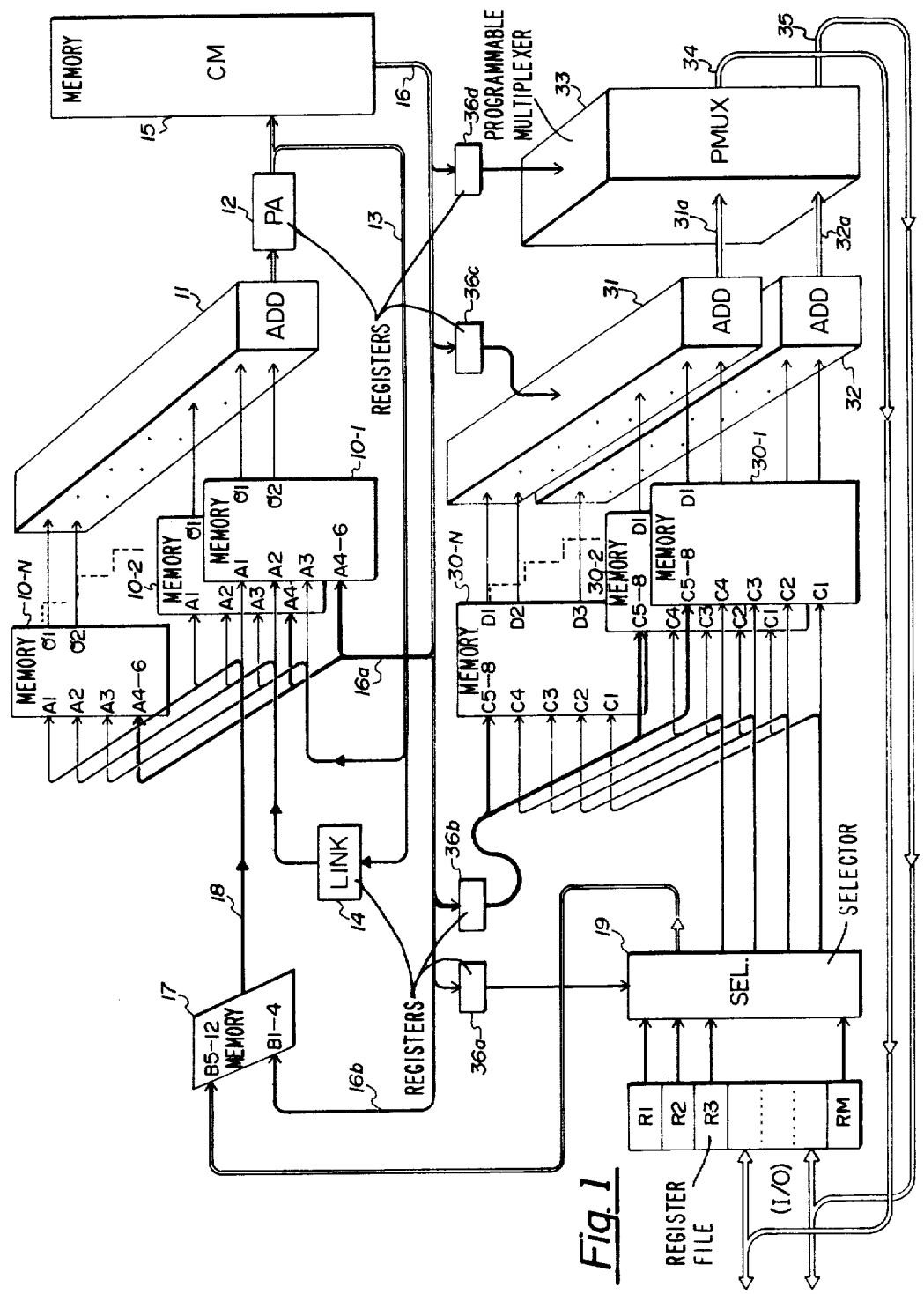
FIG. 1 is a schematic block diagram of a digital computer constructed according to the invention.

Referring now to FIG. 1, a preferred embodiment of the invention will be described. Basically, this embodiment consists of a control section, which is illustrated in the top portion of FIG. 1; and a data section, which is illustrated in the bottom portion of that figure. The function of the control section is to sequentially generate control words, while the function of the data section is to simultaneously transform operands in response to those control words.

Included in the control section is a set of N memories $10\text{-}1, 10\text{-}2, \ldots 10\text{-}N$. Each of these memories have first address inputs A1–A3, second address inputs A4–A6, and a pair of outputs O1–O2. Signals on the outputs O1 and O2 from all of those memories are summed by an adder 11, and the result is held in a register 12. Then, the latest significant bit of register 12 is fed back to address input A3 of memory 10-1; the next bit in order of significance is fed back to address input A3 of memory 10-2, etc.

All of the bits of register 12 also couple via bus 13 to a link register 14. And the least significant bit of the link register connects to address input A2 of memory 10-1, the next bit in order of significance connects to address input A2 of memory 10-2, etc.

Register 12 has its outputs connected to the address inputs of a control memory 15. This memory contains a plurality of control words which are read onto a bus 16. One portion 16A of the bus is fed back to the second address inputs A4–A6 of all of the memories 10-1 through 10-N; while another portion 16B of the bus connects to address inputs B1–B4 of a memory 17. Address inputs B5–B12 of that memory are selectively coupled to one of a plurality of registers $R1, R2, \ldots RN$ through a selector 19. And the memories N outputs 18 couple respectively to address inputs A1 of the memories 10-1 through 10-N.

All of the above components 10–19 of the control section operate to sequentially generate control words as follows. Initially, register 12 is reset to some predetermined address, such as all 0's. Control memory 15 then outputs the addressed control word on bus 16. In response to control word portion 16B, memory 17 generates on its outputs 18, a transformation of the bits on its inputs B5–B12; and in response to control word portion 16A, each of the memories 10-1 through 10-N generate on their outputs O1, and O2, a transformation of the bits on their address inputs A1–A3. Then, adder 11 sums the signals on outputs O1 and O2 from all of the memories; and the result constitutes the address of the next control word in memory 15.

Several specific examples of the transformations which the memories selectively perform are indicated in FIG. 2. In the example of row 1, the control section generates the next address for memory 15 such that it equals the present address in register 12 plus either a number N1 or N2 dependent upon whether or not bit 1 of the register from selector 19 equals a 1.

To accomplish this, memory 17 is made responsive to a predetermined code (such as 0) on its address inputs B1–B4 to generate on its outputs 18 the constant N1 or N2 dependent upon whether or not bit 1 of the signals on its address inputs B5–B12 is a 1; and at the same time, the memories 10-1 through 10-N are made responsive to a predetermined code (such as 0) on their address inputs A4–A6 to generate signals on their outputs O1 and O2 respectively indicating the sum and carry that is produced by adding the bits on their first address inputs from register 12 and memory 17.

In performing this transformation, memories 10-1 through 10-N act both as a selector and an adder of the bits on their A1 and A3 inputs. Each memory has two outputs in order that sum and carry signals can be simultaneously produced. Adder 11 then completes the arithmetic process by enabling the carries to propagate from bit to bit.

Consider next the address transformation indicated in row 2. That transformation is similar to the transformation of row 1, with the only exception being that bit 2 rather than bit 1 of the selected register is tested. To accomplish this function, memory 17 is made responsive to a predetermined code on its address inputs B1–B4 (such as a code of 1) to generate constant N1 on its outputs 18 when bit 2 of the register on its inputs B5–B12 equals 1, and to generate constant N2 when that bit equals 0. The desired address transformation is then achieved by applying code 1 to memory 17 and simultaneously applying the previously described code of 0 to the memories 10-1 through 10-N.

Next, in row 3, an example of a four way branch is illustrated. There, the next address is made equal to the present address plus either constants N1, N2, N3, or N4 depending upon whether bits 1 and 2 of the selected register respectively equal 00, 01, 10, or 11. To accomplish this, memory 17 is made responsive to another code on its address inputs B1–B4 (such as a code of 2) to generate on its outputs 18, the constants N1, N2, N3, or N4 depending upon the state of bits 1 and 2 on its address inputs B5–B12. The desired function is then achieved by applying code 2 to the address inputs B1–B4 of memory 17 and simultaneously applying the previously described code of 0 to the address inputs A4–A6 of the memories 10-1 through 10-N.

A modification of this four way branch is illustrated in row four. There, the tests which are performed on the selected register remain the same, but the increment by which the present address is modified changes by constant C. To accomplish this function, memories 10-1 through 10-N are made responsive to a new predetermined code on their address inputs A4-A6 (such as a code of 1) to generate signals on their outputs indicating the sum and carry that is obtained by adding the bits on their address input A1 and A3 to the constant C. In this case, the memories 10-1 through 10-N simultaneously perform the functions of selecting bits on their address inputs A1 and A3, generating the constant C, and adding the selected bits to that constant.

Next, the example of row 5, the control word address is formed by adding a predetermined constant to the link register. This is achieved by making memories 10-1 through 10-N responsive to another code on their address inputs A4–A6 (such as a code of 2) to generate on their respective outputs the sum and carry that are obtained by adding corresponding bits of the link register to the constant. In this case, the memories 10-1 through 10-N function to select link register 14, to generate constant C, and to add the corresponding bits of those two entities.

In row 6 of FIG. 2, the control section operates to modify link register 14 by an amount of either N1 or N2 depending upon whether bit 2 of the selector register is equal to 1 to 0. This is accomplished by applying the previously described code of 1 to address inputs B1–B4 of memory 17; and by simultaneously making the memories 10-1 through 10-N responsive to a new code on their address inputs A4-A6 (such as a code of 3) to generate on their outputs, signals representing the sum and carry of the bits on their respective A1 and A2 address inputs.

Next, in the example of row 7, the control word address is formed by combining some of the bits of register 12 with bits of other powers from memory 17. The particular example illustrated combines bits 7-N of register 12 with bits 1–6 of memory 17. This is achieved by making memories 10-1 through 10-6 responsive to a predetermined code (such as 4) on their address inputs A4–A6 to generate signals on their outputs equal to the signals on their A1 address inputs; and by making memories 10-7 through 10-N responsive to that same code to generate signals on their outputs equal to the signals on their A3 address inputs.

Figures 3, 4, 5:
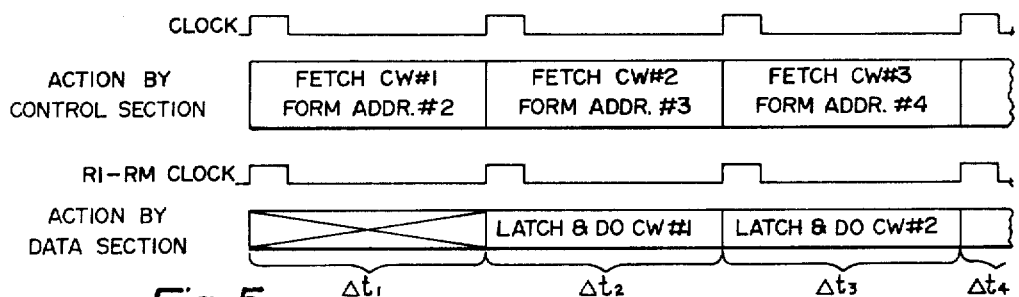
FIG. 3 illustrates one suitable code for the set of N memories which achieves the transformations of FIG. 2.
FIG. 4 illustrates representative examples of the transformations that are performed by the set of N memories in the data section of the FIG. 1 embodiment.
FIG. 5 is a timing diagram illustrating the sequence by which the data section and control section of the FIG. 1 embodiment interact.

Referring now to FIG. 3, the coding for memories 10-1 through 10-N which achieves the above functions will be described. In that figure, the symbols A1 through A6 correspond to address inputs A1–A6 on any of the memories 10-1 through 10-N.

When the A6–A4 address inputs receive a control word of 000, memories 10-1 through 10-N are to respond by generating signals representing the sum and carry that is obtained by adding corresponding bits of the present address and the output of memory 17. The present address of register 12 is received on address inputs A3, and the output of memory 17 is received on address inputs A1. Thus, where A6–A4 equals 000 in FIG. 3, the 01 output column indicates the sum of address inputs A1 and A3; and the 02 output column indicates the corresponding carry.

Similarly, when address inputs A6–A4 receive a control word of 100, memories 10-1 through 10-N must respond by generating output signals representing the sum and carry that is obtained by adding corresponding bits of the present address, memory 17, and a predetermined constant C. Any particular bit of that constant could be a "1" or a "0". In FIG. 3, outputs 01 and 02 of the right most column respectively indicate the sum and carry that are obtained by adding 1 to the bits on address inputs A1 and A3. And outputs 01 and 02 of the adjacent column respectively indicate the sum and carry that are obtained by adding "0" to those same address bits.

Next, in response to a code of 010 on address bits A6–A4, memories 10-1 through 10-N must generate signals indicating the sum and carry obtained by adding a constant C to link register 14. Those memories where the bit of constant C equals 1 have outputs 01 and 02 as illustrated in the right most column; and the remaining memories have outputs as illustrated in the adjacent column.

Finally, in response to a code of 100, one portion of the memories 10-1 through 10-N must respond by passing the signals from register 12, while the remaining memories are to pass signals from bus 18. To achieve this, the first six memories 10-1 through 10-6 are made to generate 01 output signals indicating the state of their A1 address input. This is indicated in the right most column where any word addressed with A1=1 has a "1" as its content, and any word addressed with A1=0 has a "0" as its contents. The remaining memories 10-7 through 10-N are made to generate O1 output signals indicating the state of the bits on their A3 address inputs, as is illustrated in the next adjacent column.

Referring now back to FIG. 1, the structure and operation of that computer's data section will be described. It includes a set of N memories 30-1, 30-2, . . . 30-N just as the control section did. Each of the memories 30-1 through 30-N have first address inputs C1–C4, second address inputs C5–C8, and two pairs of outputs D1-D4. Basically, the function of the memories 30-1 through 30-N is to respond to various codes on their second address inputs by generating signals on their outputs representing selectable transformations of the signals on their first address inputs.

Outputs D1 and D2 of all of the memories couple to a first adder 31, and outputs D3–D4 of all of the memories couple to another adder 32. These adders in turn have their respective outputs 31A and 32A coupled to a programmable multiplexer 33. The multiplexer operates to select and shift the signals from adders 31 and 32 onto a pair of output buses 34 and 35, which in turn feed back to registers R1-RM.

All of these components of the data section operate to transform operands in response to the control words as follows. Initially, various portions of the control word from memory 15 are placed into registers 36A, 36B, 36C, and 36D. Selector 19 then responds to the control word portion in register 36A by passing four of the registers R1-RM to the first address inputs C1–C4 of memories 30-1 through 30-N. Memory 30 receives the least significant bits on its C1–C4 inputs; memory 30-2 receives the next bit in order to significance on its C1–C4 inputs; etc.

At the same time, that portion of the control word which is in register 36B is bused in parallel to the second address inputs C5–C8 of all of the memories 30-1 through 30-N. And the memories are responsive to that control word portion to select various bits on their first address inputs C1–C4, to internally generate constants, and to generate signals on their outputs representing transformations of those selected inputs and constants.

Some representative transformations which memories 30-1 through 30-N perform are illustrated in FIG. 4. Row 1 contains a mathematical expression which indicates that in general, outputs D1–D2 generate one selectable transformation T1 of an arbitrary number N1 and the bits on the address inputs C1–C4; and outputs D3–D4 generate another totally independent transformation T2. Specific examples of this general case are expressed in rows 2 and 3.

In row 2, outputs D1 and D2 respectively equal the sum and carry of the bits on address inputs C1 and C2;

and outputs D3 and D4 respectively equal the sum and carry of the bits on address inputs C3 and C4. This transformation is useful in performing double word arithmetic. Next, in the example of row 3, outputs D1 and D2 indicate the result of logically ANDing bits on address input C1 and C2, ORing the result with the bit on address C3, ORing that result with the inverse of the bits on address input C4, and ANDing the result with an arbitrary mask M. This illustrates the generality of the transformation T1 and T2. At the same time, outputs D3 and D4 could independently generate signals indicating the sum and carry obtained by adding or subtracting bits on any of the address inputs C1–C4 and on an arbitrary constant N3.

Next, referring to FIG. 5, there is illustrated a timing diagram that shows the manner in which the above described control and data sections interact. During a time interval Δt1, the control section uses the address in register 12 to fetch a control word (CW#1) from memory 15. At the same time, the control section forms the address of the next control word by the transformation action of memories 10-1 through 10-N and memory 17. This fetching of CW#1 and address formation is complete at the end of time interval Δt1.

Subsequently during time interval Δt2, control word CW#1 directs the operation of the data section. This includes directing the transformation which memories 30-1 through 30-N perform, directing the selecting and shifting which programmable multiplexer 33 performs, etc. Also during time interval Δt2, the control section simultaneously forms the address of the next control word (CW#3). These simultaneous operations of transforming operands in the data section and calculating addresses in the control section are repeated during each of the time intervals Δt3, Δt4 . . . which follow.

Reference should now be made to FIG. 6, which illustrates a second preferred embodiment of the invention. In this embodiment, the data section and control section are integrated into one inseparable unit. This integrated unit includes some of the components of the previously described control and data sections of FIG. 1.

In particular, it includes the present address register 12, link register 14, memory 15, and memory 17 of the FIG. 1 control section. And it includes memories 30-1 through 30-N, adders 31 and 32, programmable multiplexer 33, and registers R1–RM of the FIG. 1 data section. These components are interconnected as illustrated in FIG. 6.

Also included in this second embodiment is a plurality of 2×1 multiplexers 40A–40E. These multiplexers operate to pass one portion of the presently active control word during spaced apart time intervals, and pass the remaining portion of the control words between those time intervals. This enables the integrated control-data section to alternately operate on data and form the address of the next control word. This sequential operation is illustrated in the timing diagram of FIG. 7.

In that figure, various operands in registers R1 . . . RM are selectively transformed during the spaced apart time intervals Δt11, Δt13, etc.; and the address of the next control word is formed during time intervals Δt12, Δt14, etc. Transformation of the data is accomplished in response to that portion of the control word on a bus 41. Similarly, formation of the address of the next control word is accomplished in response to that portion of the present control word on bus 42. This portion is passed through the 2×1 multiplexers 40A–40E during time intervals Δt12, Δt14, . . . etc.

One attractive feature of the FIG. 6 embodiment is that it requires a minimal amount of memory for its physical implementation. That is due to the fact that the memories 30-1 through 30-N are time shared to alternately transform data in registers R1–RM and address for the control words in memory 15. In comparison, a primary advantage of the FIG. 1 embodiment is that it performs the address transformations and the data transformations simultaneously. This simultaneity however, is achieved at the expense of incorporating additional hardware—i.e., memories 10-1 through 10-N and adder 11. Thus, the two embodiments offer a trade off between performance and space.

Next, referring to FIG. 8, one preferred physical layout for the invention on a semiconductor chip will be described. In this layout the least significant bit (bit 1) of all of the registers and the corresponding portion of the selector 19 are indicated by reference numeral 50-1. Similarly, reference numerals 50-2, . . . 50-N-1, 50-N respectively indicate bit 2, bit N-1, and bit N of all of the registers and their corresponding selector portion.

A plurality of leads 51 run between those registers as illustrated. One lead is provided for each register; and a signal is applied to the lead to select the corresponding register. Bit 1 of the selected registers is gated onto leads 52-1; bit N of the selected registers is gated onto leads 52-N; etc.

Memory 30-1 lies alongside of registers 50-1; and its C1–C4 address inputs are respectively coupled to the leads 52-1. Similarly, memory 30-N lies alongside of registers 50-N; and its C1–C4 address inputs are respectively coupled to leads 52-N. Also, a bus 53 of leads runs alongside of memories 30-1 through 30-N. This bus couples in parallel to the address inputs C5–C8 of all of the memories; and it carries decode signals of the presently active control word for the memories.

Adder 31 runs alongside of bus 53 as illustrated. It receives the D1 and D2 output signals from all of the memories 30-1 through 30-N. Similarly, adder 32 runs alongside of adder 31; and it receives the D3 and D4 output signals from all of the memories. Multiplexer 33 lies between the adders 31 and 32; and it receives control signals from the control word on leads 54. Outputs from the multiplexer are coupled back to registers 50-1 through 50-N by leads 55-1 through 55-N respectively.

Additional details of the above physical layout are illustrated in FIGS. 9a and 9b. These details point out the ease with which the invention functional operation may be completely changed. Consider first the structure of multiplexer 33 as illustrated in FIG. 9a. It includes two sets of N metal lines 60-1 through 60-2N. Half of them (lines 60-1 through 60-N) carry output signals from adder 31; whereas the other half carry output signals from adder 32.

Lying between lines 60-N and 60-N+1 is another set of metal lines 54. They carry control signals which are decodes of that portion of the control word that is sent to the multiplexer. One line is provided for each function that the multiplexer performs.

Each of the metal lines 54 connects via respective polysilicon leads 61 to transistor 62 and 63 as illustrated. The source of the transistors 62 are all connected to one of the multiplexer's output lines 55-1; and the source of the transistors 63 are connected to one of the output lines 55-N.

Also, each of the transistors 62 and 63 has a drain which is respectively connected to the diffusions 64 and 65. These diffusions run beneath and perpendicular to all of the metal lines 60-1 through 60-2N. To program output 55-1 of the multiplexer, each of the diffusions 64 are selectively connected to one of the overlying metal lines during the fabrication process. Reference numerals 66 and 67 illustrate examples of where these contacts could be made.

Similarly, to program output 55-N, each of the diffusions 65 is selectively connected to one of the metal lines 60-1 through 60-2N. Examples of these connections are indicated by reference numerals 68 and 69.

Next, referring to FIG. 9b, there is illustrated a portion of one of the memories 30-1 through 30-N. It includes a plurality of spaced apart metal lines 80-1, 80-2, . . . as illustrated. One metal line is provided for each possible code on the memories second address inputs C5-C8. These metal lines are coupled through respective transistors 81-1, 81-2, . . . to one of the memories outputs, such as output D1. Transistors 81-1, 81-2, . . . are selectively enabled by a decode of the second address inputs C5-C8.

A plurality of polysilicon lines 82-1, 82-2, . . . lie under and run perpendicular to the metal lines. Signals SS1, SS2, . . . are selectively generated on one of the polysilicon lines 82-1, 82-2, . . . by a decoder of the C1-C4 address inputs. Polysilicon line 82-1 forms the gate of a plurality of transistors T1, T2, . . . Ti whose sources and drains are formed by a diffusion 83-1. Similarly, polysilicon line 82-2 forms the gates of a plurality of transistors T1, T2, . . . Ti whose sources and drains are formed by a diffusion 83-2.

All of the sources of those transistors are connected to 0 volts. However, the drains of those transistors are selectively connected during the fabrication process to one of the metal lines 80. Reference numerals 84 indicate one exemplary set of contacts between the diffusions 83 and the metal lines 80. The absence of a contact is indicated by reference numerals 85.

In this example, when signals S1 and SS1 are simultaneously generated by the address inputs C1-C8, 0 volts is coupled from diffusion 83-1 through a contact 84 to metal line 80-1. This forces output signal D1 to approximately 0 volts. In comparison, the D1 output signal is approximately 5 volts when the contact 84 is eliminated. Thus, the D1 output signals may be made either a logical 0 or a logical 1 in accordance with the previously described FIG. 3 by including or excluding the appropriate contact 84.

All of the optional contacts in the FIG. 9b memories are made in the same manner as the optional contacts in the FIG. 9a programmable multiplexer. That is, the optional contacts in both of those components are made between a metal line and a diffusion. Thus, the entire operation of the disclosed embodiments can be changed completely simply by reworking the mask that defines the location of the holes for those contacts.

Various preferred embodiments of the invention have now been described in detail. In addition, many changes and modifications can be made to these details without departing from the nature and spirit of the invention. For example, the optional connections in the FIG. 9a programmable multiplexer, and the optional contacts in the FIG. 9b memory may be made at the diffusion level. That is in FIG. 9a, the metal to diffusion connections in holes 66, 67, 68, and 69 would always be made; and in FIG. 9b, the metal to diffusion connections in holes 84 and 85 would also always be made. Then a small (e.g. 3-4 micros) patch would optionally be provided in the diffusions near the above connections.

As another modification, the memories 10-1 through 10-N could be read/write or PROM type memories. Also, memories 30-1 through 30-N of either the FIG. 1 or FIG. 6 embodiment could be similarly modified. Further, any of the registers R1-RM, Link, and PA may be content addressable, or part of a stack. Therefore, since many such modifications are possible, it is to be understood that the invention is not limited to said details but as defined by the appended claims.

What is claimed is:

1. A digital computer having a control section for sequentially generating addresses to a control memory from digital data of any kind, said control section being comprised of:
 a plurality of programmable memory means, each of said memory means having first address inputs, second address inputs coupled to receive a portion of the presently active control word from said control memory, and a pair of outputs;
 a plurality of register means for storing said digital data, each of said register means having its ith bit coupled to the first address inputs on the ith one of said memory means, where $i = 1, 2 \ldots N$, N being the total number of programmable memory means;
 each of said memory means including means responsive to the control word portion on its second address inputs for generating signals on its pair of outputs representing programmable arithmetic transformations of the bits on its first address inputs; and
 means for combining said signals on said pair of outputs from all of said memory means into said control memory address.

2. A digital computer according to claim 1, wherein said means for combining further includes:
 adder means coupled to the pair of outputs from all of the memory means in said plurality for combining said output signals formed thereon into signals representative of their sum.

3. A digital computer according to claim 1, wherein said control section further includes another memory means having first address inputs coupled to a plurality of bits from one of said registers, and having multiple outputs with the ith output being coupled to a first address input on the ith one of said N memory means.

4. A digital computer according to claim 3, wherein said another memory means also includes second address inputs coupled to receive a portion of said control word and is responsive thereto for generating digital numbers on its multiple outputs indicating various states of the register coupled to its first address inputs.

5. A digital computer according to claim 3, wherein said one register is coupled to said another memory means through a selector means for selecting said one register from said plurality.

6. A digital computer according to claim 1, wherein each memory means of said plurality is responsive to a predetermined code on their second address inputs to generate signals on their pair of outputs indicating the sum and carry obtained by adding together selectable bits on their first address inputs.

7. A digital computer according to claim 1, wherein each memory means of said plurality is responsive to a predetermined code on their second address inputs to generate signals on their pair of outputs indicating the sum and carry obtained by adding selectable bits on their first address inputs to a predetermined constant.

8. A digital computer according to claim 1, wherein some of the memory means of said plurality are responsive to a predetermined code on their second address inputs to generate signals on their outputs indicating a transformation of bits from one selectable register on their first address inputs, and the other memory means of said plurality are responsive to the same predetermined code to generate signals on their outputs indicating a transformation of bits from another selectable register on their first address inputs.

9. A digital computer according to claim 1, wherein all of the memory means of said plurality are read-only memories.

10. A digital computer according to claim 1, wherein at least a portion of the memory means of said plurality are read-write memories.

11. A digital computer having a data section for transforming digital operands of any kind in response to control words; said data section being comprised of:
   a plurality of programmable memory means; each of said memory means having first address inputs, second address inputs coupled to receive a portion of the presently active control word, and at least one pair of outputs;
   each of said memory means including a means responsive to the control word portion on its second address inputs for generating output signals representing programmable transformations of the bits on its first address inputs;
   a plurality of register means for storing said operands; each of said register means having its ith bit coupled to the first address inputs on the ith one of said memory means, where i = 1, 2, ... N, N being the total number of programmable memory means;
   adder means coupled to the pairs of outputs from all of the memory means in said plurality for combining said output signals from all of said memory means into signals representative of their sum; and
   means for simultaneously shifting selectable outputs of said adder means by a programmable number of bit positions in response to another portion of said active control word, the output of the means for shifting being the transformed operands.

12. A digital computer according to claim 11, wherein each memory means of said plurality has two pairs of outputs.

13. A digital computer according to claim 12, wherein at least four registers of said plurality are simultaneously coupled through a selector means to said first address inputs of said plurality of N memory means.

14. A digital computer according to claim 12, wherein each memory means of said plurality is responsive to a predetermined code on their second address inputs to generate signals on one of their output pairs indicating the sum and carry obtained by adding bits from two selectable registers on their first address inputs, and simultaneously to generate signals on their other output pair indicating the sum and carry obtained by adding bits from two other selectable registers onto their first address inputs.

15. A digital computer according to claim 12, wherein each memory means of said plurality is responsive to a predetermined code on their second address inputs to generate signals on one of their output pairs indicating one selectable transformation of the bits from two selectable registers on their first address inputs, and simultaneously to generate signals on the other output pair indicating another selectable transformation on the bits from the same two registers.

16. A digital computer according to claim 12, wherein each memory means of said plurality is responsive to a predetermined code on their second address inputs to generate signals on one of their output pairs indicating one selectable transformation of the bits from two selectable registers on their first address inputs, and simultaneously to generate signals on their other output pair indicating another selectable transformation of the bits from two other selectable registers coupled to their first address inputs.

17. A digital computer according to claim 11, wherein all of the memory means of said plurality are read-only memories.

18. A digital computer according to claim 11, wherein at least a portion of the memory means of said set are read/write memories.

19. A digital computer according to claim 11, wherein said means for shifting the outputs of said adder means is programmed by a selectable number of contacts.

20. A digital computer according to claim 11, wherein said plurality of N memory means, said plurality of registers, said adder means, and said means for shifting are all packaged in a single semiconductor chip.

21. A digital computer having an integrated control/data section for generating addresses to a control memory from digital data of any kind during spaced apart time intervals and for transforming digital operands of any kind between said time intervals in response to control words in said control memory at said addresses; wherein said integrated control/data section is comprised of:
   a plurality of programmable memory means where N is a positive integer; each of said memory means having first address inputs, second address inputs, and at least one pair of outputs;
   a plurality of register means for storing said digital data and operands; each of said register means having its ith bit coupled to the first address inputs on the ith one of said memory means, where i = 1,2 ... N, N being the total number of programmable memory means;
   means for coupling one portion of said control words to the second address inputs on all of the memory means of said plurality during said spaced apart time intervals, and for coupling another portion of said control words thereto between said time intervals;
   each of said memory means including a means responsive to the control word portion on its second address inputs for generating output signals representing programmable transformations of the bits on its first address inputs; and
   means for combining said signals on said pair of outputs from all of said memory means into said control memory address during said time intervals and into said transformed operand between said time intervals.

22. A digital computer according to claim 21, wherein said control section further includes another memory means having first address inputs coupled to a plurality of bits from one of said registers, and having multiple outputs with the ith output being coupled to a first address input on the ith one of said N memory means.

23. A digital computer according to claim 22, wherein said another memory means also includes second address inputs coupled to receive a portion of said control word and is responsive thereto for generating digital numbers on its multiple outputs indicating various states of the register coupled to its first address inputs.

24. A digital computer according to claim 21, wherein at least four registers of said plurality are simultaneously coupled through a selector means to the first address inputs of said plurality of N memory means.

25. A digital computer according to claim 21 wherein said means for combining includes an adder means coupled to the pair of outputs from all of said memory means for arithmetically combining said output signals formed thereon into signals representative of their sum; and means for simultaneously shifting selectable outputs of said adder means by programmable number of bit positions in response to a portion of said control word.

26. A digital computer according to claim 21, wherein each memory means of said plurality includes a plurality of selectable electrical contact means for programming said transformations.

27. A digital computer according to claim 21, wherein said plurality of N memory means, said plurality of registers, and said coupling means are all packaged in a single semiconductor chip.

28. A digital computer according to claim 21, wherein said means for coupling consists essentially of a 2×1 multiplexer means.

29. A digital computer according to claim 21, wherein all of the memory means of said plurality are read-only memories.

30. A digital computer according to claim 21, wherein at least a portion of said plurality of memory means are read/write memory means.

* * * * *